UNITED STATES PATENT OFFICE.

GEORGE B. MULLOY, OF CHICAGO, ILLINOIS, ASSIGNOR TO ARMOUR AND COMPANY, OF CHICAGO, ILLINOIS, A CORPORATION OF ILLINOIS.

ACTIVATED-SLUDGE TREATMENT.

1,254,836.  Specification of Letters Patent.  Patented Jan. 29, 1918.

No Drawing.  Application filed July 9, 1917.  Serial No. 179,457.

*To all whom it may concern:*

Be it known that I, GEORGE B. MULLOY, a citizen of the United States, residing at Chicago, in the county of Cook and State of Illinois, have invented certain new and useful Improvements in Activated-Sludge Treatment, of which the following is a specification.

The activated sludge method of sewage disposal, though of comparatively modern origin and in its infancy, is one which is well known and constitutes a field of activity for sanitary engineers in the effort to surmount present difficulties in its application to a wider range of usefulness and in experimentation to increase its efficiency and economical availability.

Briefly and generally stated, the activated sludge treatment of sewage consists in conducting the raw sewage into and through aerating tanks provided with means for the introduction of air under pressure to the bottom of the tank, whereby the air is caused to bubble up through the liquid sewage. The passage of the air through the sewage develops in time microscopic aerobic organisms which in the course of their growth or by means of conditions provided by their growth, oxidize the colloidal and soluble solids in the sewage causing them to separate out as flocculent particles. The treated sewage, at the proper stage is run into a settling tank where it is allowed to remain quiescent for from thirty minutes to one hour, and the solids settle to the bottom as a flocculent ooze, called activated sludge.

The remaining liquid content of the sewage is rendered perfectly clear, white and odorless. This effluent liquid may then be run off through the sewers to rivers or other natural channels without injury to fish or menace to the health or comfort of people living adjacent thereto.

The activated sludge is removed from the bottom of the tank, to be freed of its water content, and when dried is available as a fertilizer, containing a large percentage of ammonia compounds and being practically free from any offensive odors.

To make the process continuous and in order to hasten the treatment of the raw sewage, it is found advantageous to inoculate the same upon its introduction to the aerating tanks with activated sludge from sewage previously treated, whereby the process is reduced in point of time from several days to a few hours.

The application of this activated sludge method of sewage disposal to industrial sewage such as that resulting from packing houses is accompanied with many difficulties which have heretofore militated against its general adoption, it having been found that the operation of the method as worked out in connection with the disposal of domestic or municipal sewage does not in all respects follow when the system is applied to the more highly concentrated sewage resulting from the packing industry.

Packing house sewage originates from many and varied departments, such as the abattoirs, the power plant, the lard refinery, the oleomargarin, canning, curing and sausage departments, the rendering tanks, and the fertilizer plants, as well as many other smaller departments, together with the domestic sewage of many thousands of employees. The resultant composite sewage is much more concentrated than the ordinary domestic sewage and contains approximately four to twenty times as much suspended solids, averaging about 500 to 5,000 parts suspended solids in 1,000,000. These suspended solids consists largely of organic material.

It is found that where this raw sewage in its concentrated state is inoculated as it enters the aerating tank by means of activated sludge resulting from the aeration of previous quantities of sewage, the high degree of concentration is such that the treatment is not as efficient as where the same methods are applied to the more highly diluted domestic sewage.

The dilution of the raw sewage by means of water to reduce its consistency is accompanied by the disadvantage of its requiring a large supply of water for the purpose and also that of multiplying the quantity of liquid to be handled; and, moreover, the increase in efficiency resulting from such dilution with plain water is disappointing.

I have discovered that the efficiency of the activated sludge method of treatment is greatly increased with relation to sewage of this character by diluting the raw sewage with the effluent liquid resulting from previously treated sewage, thus avoiding an increase in the volume of material undergoing treatment and also utilizing the vitality of the effluent liquid to assist the inoculation of the fresh sewage, so that the time of aeration in the activated sludge process is thereby greatly shortened.

I claim:

The improvement in the activated sludge method of treatment as applied to industrial sewage which consists in preliminary diluting the raw sewage with effluent liquid from previously treated sewage.

In testimony whereof I have hereunto signed my name in the presence of two subscribing witnesses.

GEORGE B. MULLOY.

Witnesses:
A. B. A. WALTON,
E. G. McDONALD.